US 11,107,043 B2

(12) United States Patent
Ohsumi

(10) Patent No.: US 11,107,043 B2
(45) Date of Patent: Aug. 31, 2021

(54) INFORMATION MANAGEMENT DEVICE, METHOD OF MANAGING ARRIVAL/DEPARTURE, AND RECORDING MEDIUM

(71) Applicant: CASIO COMPUTER CO., LTD., Tokyo (JP)

(72) Inventor: Tsuyoshi Ohsumi, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 142 days.

(21) Appl. No.: 15/814,959

(22) Filed: Nov. 16, 2017

(65) Prior Publication Data

US 2018/0181918 A1    Jun. 28, 2018

(30) Foreign Application Priority Data

Dec. 27, 2016   (JP) .............................. JP2016-252799
Aug. 25, 2017   (JP) .............................. JP2017-162139

(51) Int. Cl.
| | |
|---|---|
| *G07C 1/10* | (2006.01) |
| *H04W 4/12* | (2009.01) |
| *G07C 9/28* | (2020.01) |
| *H04W 4/80* | (2018.01) |
| *H04W 4/021* | (2018.01) |
| *G06Q 10/10* | (2012.01) |
| *H04W 88/02* | (2009.01) |

(52) U.S. Cl.
CPC .......... *G06Q 10/1091* (2013.01); *G07C 1/10* (2013.01); *G07C 9/28* (2020.01); *H04W 4/12* (2013.01); *H04W 4/021* (2013.01); *H04W 4/80* (2018.02); *H04W 88/02* (2013.01)

(58) Field of Classification Search
CPC ............................... G06Q 40/125; G07C 1/10
See application file for complete search history.

(56) References Cited

U.S. PATENT DOCUMENTS

2003/0088534 A1*  5/2003  Kalantar ................ G06Q 10/06
                                                          706/50
2006/0224478 A1* 10/2006  Harbison ............... G06Q 10/00
                                                          705/32
(Continued)

FOREIGN PATENT DOCUMENTS

| CN | 103617502 A | 3/2014 |
|---|---|---|
| CN | 105408921 A | 3/2016 |

(Continued)

OTHER PUBLICATIONS

Chinese Office Action dated Jan. 19, 2020, in a counterpart Chinese patent application No. 201711267694.5. (A machine translation (not reviewed for accuracy) attached.).

(Continued)

*Primary Examiner* — Peter Ludwig
*Assistant Examiner* — Avia Salman
(74) *Attorney, Agent, or Firm* — Chen Yoshimura LLP

(57) ABSTRACT

An arrival/departure management device performs near-field communication with a wireless communication terminal and identifies a user of the wireless communication terminal, registers a time of arrival or departure for the user of the wireless communication terminal that was identified, and sends or receives information corresponding to the identified user on the basis of the registered content.

5 Claims, 11 Drawing Sheets

(56) References Cited

U.S. PATENT DOCUMENTS

| | | | | |
|---|---|---|---|---|
| 2008/0114683 A1* | 5/2008 | Neveu | ................... | G07C 9/257 |
| | | | | 705/50 |
| 2015/0117995 A1* | 4/2015 | D'Andrea | ............... | B66F 9/075 |
| | | | | 414/467 |
| 2016/0171451 A1* | 6/2016 | Pugh | ................. | G06Q 10/1093 |
| | | | | 705/7.18 |

FOREIGN PATENT DOCUMENTS

| | | | |
|---|---|---|---|
| JP | 2002-208050 A | 7/2002 | |
| JP | 2005-251226 A | 9/2005 | |
| JP | 2009-193291 A | 8/2009 | |
| JP | 2015-121969 A | 7/2015 | |
| JP | 5809001 B2 * | 11/2015 | ............... G07C 9/00 |

OTHER PUBLICATIONS

Japanese Office Action dated Sep. 17, 2019, in a counterpart Japanese patent application No. 2017-162139. (A machine translation (not reviewed for accuracy) attached.).

Chinese Office Action dated Sep. 30, 2020, in a counterpart Chinese patent application No. 201711267694.5. (A machine translation (not reviewed for accuracy) attached.).

\* cited by examiner

| Terminal Management ID | Terminal Name | Identification Information | User |
|---|---|---|---|
| A001 | Device A | 012341 | Employee A |
| A002 | Device B | 012342 | Employee B |
| A003 | Device C | 012343 | Employee C |

FIG. 4

| Task Management ID (61) | Task Name (62) | Task Detail (63) | Task Recipient (64) | Scheduled Transmission Date (65) | Transmission Status (66) | Completion Status (67) |
|---|---|---|---|---|---|---|
| C001 | Task A | Details 1 | Employee A | Dec 15, 2016 | Y | Y |
| C002 | Task B | Details 2 | Employee C | Dec 15, 2016 | Y | N |
| C003 | Task C | Details 3 | Employee A | Dec 16, 2016 | N | N |
| C004 | Task D | Details 4 | Employee B | Dec 16, 2016 | N | N |
| C005 | Task E | Details 5 | Employee C | Dec 16, 2016 | N | N |
| ... | ... | ... | ... | ... | ... | ... |

FIG. 6

INFORMATION MANAGEMENT DEVICE, METHOD OF MANAGING ARRIVAL/DEPARTURE, AND RECORDING MEDIUM

TECHNICAL FIELD

The present invention relates to an information management device, a method of managing arrival/departure, and a recording medium.

BACKGROUND ART

One known method of managing the times at which employees arrive at/depart from work involves performing near-field communication with employees' portable terminals and recording these communication times as the times at which employees arrived/departed. There are also conventional technologies that use registration of the times at which employees arrive/depart as an opportunity to send various types of information to employees.

For example, one conventional method involves comparing arrival/departure times input via operations performed when employees arrive/depart to distribution start times and distribution end times of stored notification information, thereby making it possible to send stored notification information to devices only when employees' arrival/departure times are later than the distribution start times and earlier than the distribution end times (see Japanese Patent Application Laid-Open Publication No. 2005-251226, for example).

However, although this conventional method allows notification information to be sent on the basis of arrival/departure times input when employees arrive/depart, the notification information is simply sent when those arrival/departure times satisfy prescribed conditions. Therefore, it is not possible to distinguish between arrival and departure and to send necessary information in each situation or to send information corresponding to each employee, for example.

When sending information, it is desirable that arrival be distinguished from departure and that it be possible to send information relevant to each individual employee. It is also preferable that it be possible to perform any control processes other than sending information that are necessary upon arrival/departure. Furthermore, it should be possible to perform similar control processes not only upon arriving at and departing from work but also upon arriving at/departing from prescribed locations.

Accordingly, the present invention is directed to a scheme that substantially obviates one or more of the problems due to limitations and disadvantages of the related art.

SUMMARY OF THE INVENTION

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an information management device, including: a processor; a storage device connected to the processor; and a near-field wireless communication unit connected to the processor, configured to wirelessly communicate with a wireless communication terminal when the wireless communication terminal is within a near-field communication range, wherein the processor identifies a user to which the wireless communication terminal is assigned based on information received by the near-field wireless communication unit from the wireless communication terminal, and wherein the processor registers a time of arrival or departure of the user identified by the processor in the storage device, and when the processor registers the time of arrival or departure, the processor at the same time causes the near-field wireless communication unit to receive or send information corresponding to the identified user other than the information used to identify the user, from or to the wireless communication terminal.

In another aspect, the present disclosure provides a method of managing arrival/departure using a device having a processor; a storage device connected to the processor; and a near-field wireless communication unit connected to the processor, configured to wirelessly communicate with a wireless communication terminal when the wireless communication terminal is within a near-field communication range, the method being performed by the processor and including: identifying a user to which the wireless communication terminal is assigned based on information received by the near-field wireless communication unit from the wireless communication terminal; registering a time of arrival or departure of the user identified by the processor in the storage device; and causing the near-field wireless communication unit to receive or send information corresponding to the identified user other than the information used to identify the user, from or to the wireless communication terminal when registering the time of arrival or departure of the user.

In another aspect, the present disclosure provides a non-transitory computer-readable storage medium that stores instructions executable by a processor that is connected to a storage device and a near-field wireless communication unit configured to wirelessly communicate with a wireless communication terminal when the wireless communication terminal is within a near-field communication range, the instructions causing the processor to perform the following: identifying a user to which the wireless communication terminal is assigned based on information received by the near-field wireless communication unit from the wireless communication terminal; registering a time of arrival or departure of the user identified by the processor in the storage device; and causing the near-field wireless communication unit to receive or send information corresponding to the identified user other than the information used to identify the user, from or to the wireless communication terminal when registering the time of arrival or departure of the user.

It is to be understood that both the foregoing general description and the following detailed description are exemplary and explanatory, and are intended to provide further explanation of the invention as claimed.

BRIEF DESCRIPTION OF THE DRAWINGS

The detailed descriptions below are intended to be read with reference to the following figures in order to gain a deeper understanding of the present application.

FIG. 4 illustrates the configuration of a terminal DB.

FIG. 6 illustrates the configuration of a task DB.

DETAILED DESCRIPTION OF EMBODIMENTS

Figure 1:
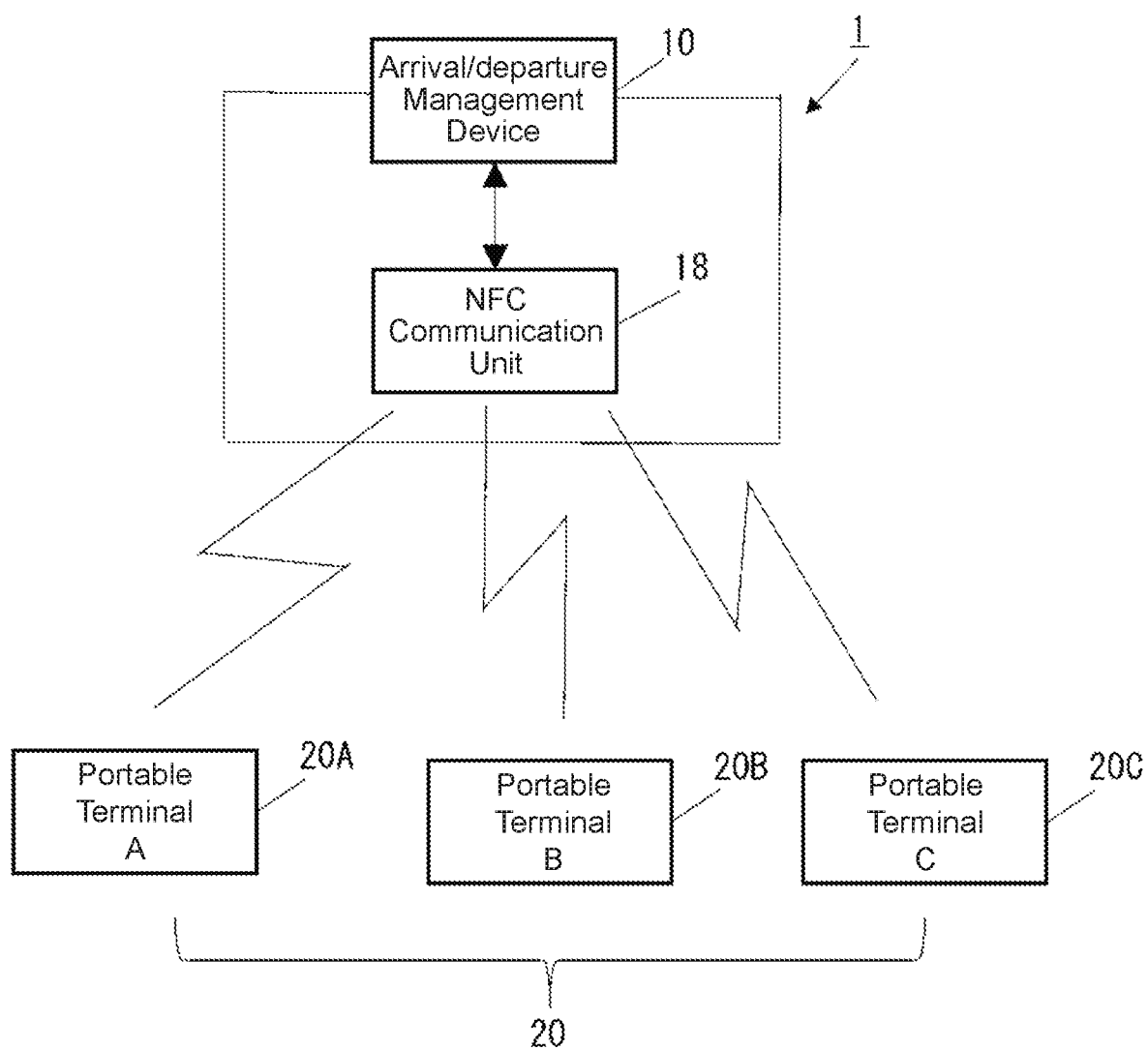
FIG. 1 is a block diagram illustrating an arrival/departure management system according to Embodiment 1.

Embodiments of the present invention will be described in detail below with reference to the attached drawings. It should be noted that the present invention is not limited to the examples illustrated in the drawings.

A. Embodiment 1

Next, a system configuration and a device configuration will be described with reference to FIGS. 1 and 2. Note that the embodiments of the present invention will be described using arriving at work and departing from work as examples of arriving at and departing from a location. First, an arrival/departure management system 1 according to Embodiment 1 will be described with reference to FIG. 1 as an example of an information management system. FIG. 1 is a block diagram illustrating the arrival/departure management system 1 according to Embodiment 1.

The arrival/departure management system 1 includes an arrival/departure management device 10 and portable terminals 20A to 20C (which will be referred to collectively as "portable terminals 20") and primarily manages the times at which company employees arrive at and depart from work. The number of the portable terminals 20 included in the arrival/departure management system 1 is not particularly limited, but here a plurality of terminals are included. Moreover, in practice, the configuration should include as many terminals as there are employees.

The arrival/departure management device 10 is a server in a network-connected server-client system, for example, but is not limited to this example and may be a virtual machine running on a cloud system.

The portable terminals 20 are wireless communication-enabled portable terminal devices respectively belonging to the company employees. Although here the portable terminals 20 are smartphones, the portable terminals 20 are not limited to this example and may be another type of terminal device that is portable.

Moreover, the portable terminals 20 are equipped with a near-field communication (NFC) feature. This makes it possible for employees to initiate NFC arrival/departure processes (described in more detail later) by bringing their portable terminals 20 near an NFC communication unit 18 of the arrival/departure management device 10.

Next, a physical configuration of the arrival/departure management device 10 (an example of an information management device) will be described with reference to FIG. 2. FIG. 2 illustrates the physical configuration of the arrival/departure management device 10.

Figure 2:
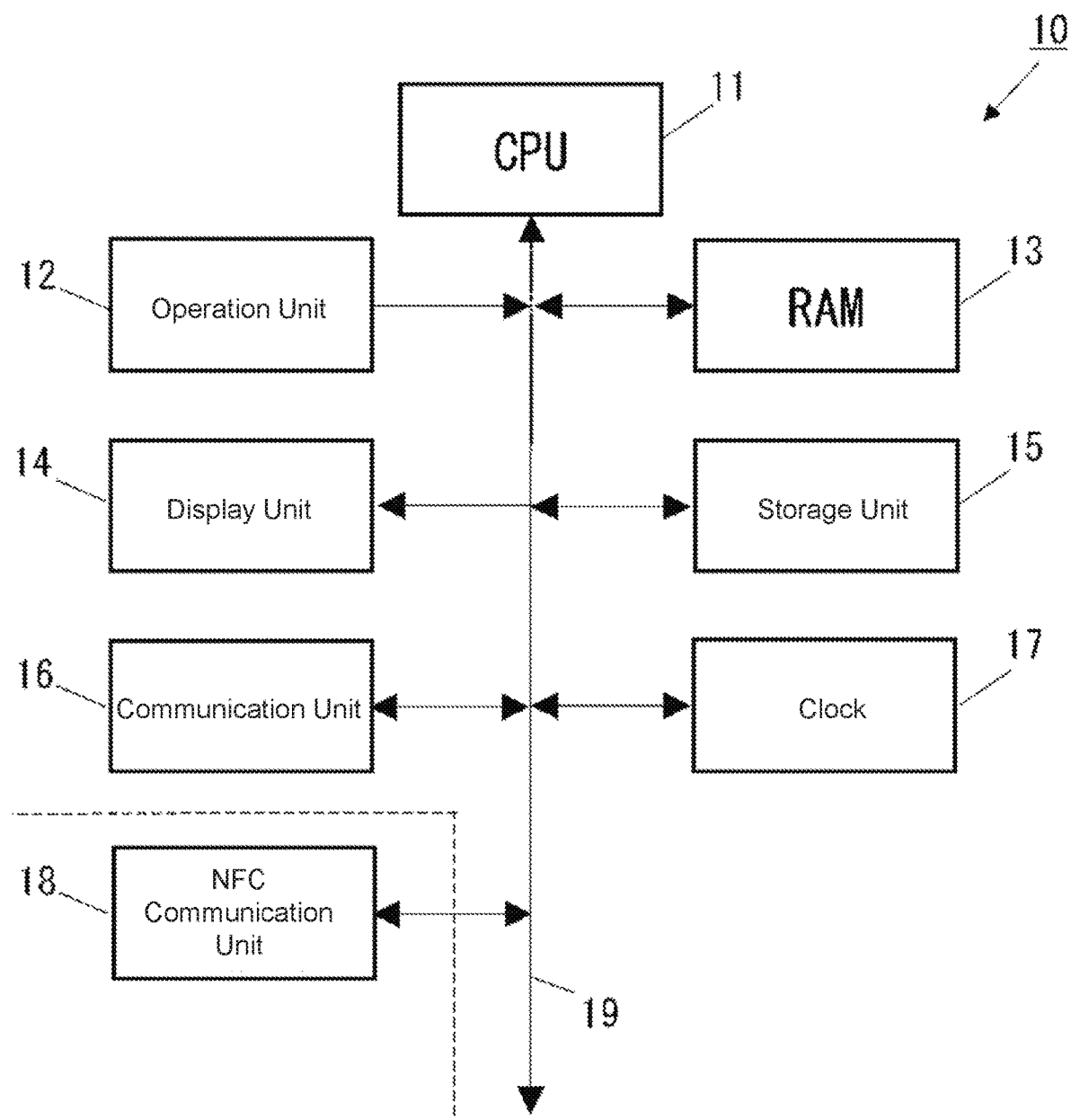
FIG. 2 is a block diagram illustrating the physical configuration of an arrival/departure management device.

As illustrated in FIG. 2, the arrival/departure management device 10 includes a central processing unit (CPU) 11, an operation unit 12, a random-access memory (RAM) 13, a display unit 14, a storage unit 15, a communication unit 16, a clock 17, the NFC communication unit 18, and the like. The components of the arrival/departure management device 10 are connected together via a bus 19. Moreover, the CPU 11 may be a processor.

The CPU 11 controls the components of the arrival/departure management device 10. The CPU 11 loads specified programs from among system programs and application programs stored on the storage unit 15 into the RAM 13 and uses the programs loaded into the RAM 13 to execute various processes.

The operation unit 12 includes a key input unit such as a keyboard as well as a pointing device such as a mouse, receives key input and positional input, and outputs this operation information to the CPU 11.

The RAM 13 is volatile memory and provides a working area for temporarily storing various types of data and programs. The display unit 14 is a liquid crystal display (LCD), an electroluminescent (EL) display, or the like and displays various types of information in accordance with display information from the CPU 11.

The storage unit 15 is a readable/writable storage unit for data and programs, such as a hard disk drive (HDD) or a solid-state drive (SSD). More specifically, the storage unit 15 stores a terminal database (DB) 40, an arrival/departure DB 50, and a task DB 60 that are described later.

The communication unit 16 is a network card or the like and is connected to a communication network to communicate with other devices on the communication network.

The clock 17 is a real-time clock that keeps the current date and time and outputs current time information representing the current date and time to the CPU 11.

The NFC communication unit 18 is an NFC communication interface. More specifically, the NFC communication unit 18 includes a coil antenna that uses high-frequency 13.56 MHz current to create magnetic flux. The NFC communication unit 18 introduces a 13.56 MHz carrier current modulated by a signal to the coil antenna in order to transmit a carrier wave.

Moreover, the NFC communication unit 18 does not necessarily need to be physically inside the arrival/departure management device 10 and may be installed in a location separated from the rest of the configuration. In this case, the arrival/departure management device 10 should be configured such that information obtained by the NFC communication unit 18 can be output to the CPU 11 or the like via the communication unit 16, for example.

Figure 3:
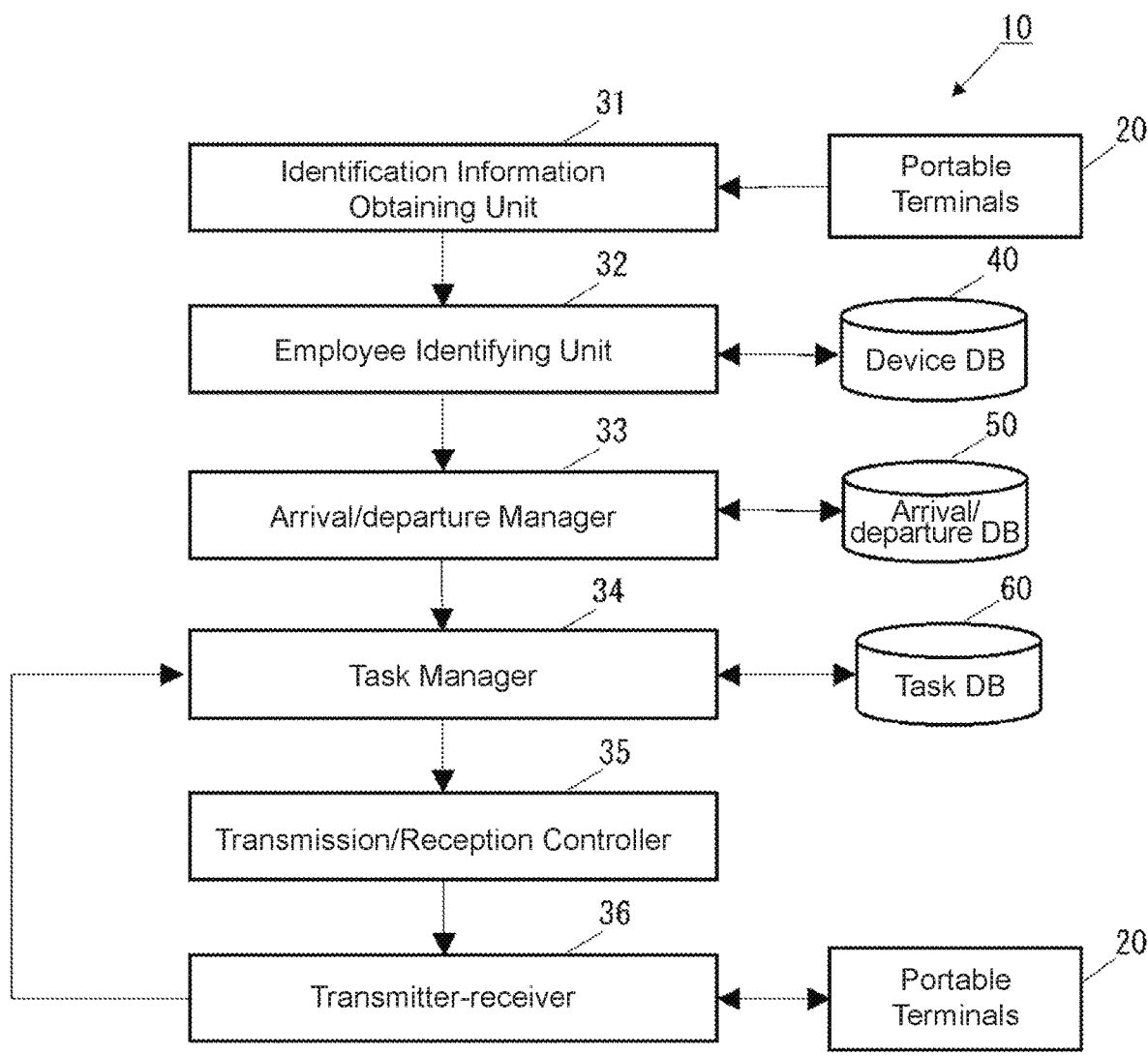
FIG. 3 is a block diagram illustrating the functional configuration of the arrival/departure management device.

Next, the functional configuration of the arrival/departure management device 10 will be described with reference to FIG. 3. FIG. 3 is a block diagram illustrating the functional configuration of the arrival/departure management device 10.

The arrival/departure management device 10 includes an identification information obtaining process 31, an employee identifying process 32, an arrival/departure managing process 33, a task managing process 34, a transmission/reception control process 35, and a transmitting-receiving process 36.

The identification information obtaining process 31 obtains the identification information of an employee's portable terminal 20 by performing NFC communication via the NFC communication unit 18 upon determining that the portable terminal 20 is within NFC communication range. In other words, the identification information obtaining process 31 (detection process) detects when a connection has been established with a wireless communication terminal and obtains the identification information of the portable terminal 20 upon this detection being made.

More specifically, the identification information is obtained by making the arrival/departure management device 10 operate in a reader/writer mode to read the portable terminal 20, which operates in an NFC card emulation mode.

In the employee identifying process 32, the CPU 11 uses the identification information of the portable terminal 20 obtained by the identification information obtaining process 31 to identify the employee who is the user of that portable terminal 20 from the terminal DB 40 (described later).

In the arrival/departure manager 33, the CPU 11 manages arrival and departure information for the employee identified by the employee identifying process 32. More specifically, the times at which communication with the portable terminal 20 are performed are registered in the arrival/departure DB 50 (described later) as the times at which that employee arrived or departed. Here, the times to register should be obtained from the clock 17.

In the task manager 34, the CPU 11 manages information registered in the task DB 60 (described later). More specifically, on the basis of the information registered to the arrival/departure DB 50 by the arrival/departure manager 33, tasks (task information) that need to be sent are extracted from the task DB 60, and the completion statuses (completion status information) of received tasks are registered to the task DB 60.

The transmission/reception controller 35 executes control processes for sending information when the task manager 34 extracts information from the task DB 60 that needs to be sent to the portable terminals 20. The transmission/reception controller 35 also executes control processes for receiving task completion status information from the portable terminals 20 when the task manager 34 determines that there is task information for which the completion status needs to be checked.

The transmitter-receiver 36 sends information to and receives information from the portable terminals 20 on the basis of the control processes executed by the transmission/reception controller 35. Transmission/reception may be performed via the NFC communication unit 18 or may be performed via the communication unit 16. Moreover, the task manager 34 registers information sent and received by the transmitter-receiver 36 in the task DB 60, which will be described in more detail later.

Next, the terminal DB 40 stored in the storage unit 15 of the arrival/departure management device 10 will be described with reference to FIG. 4. FIG. 4 illustrates the configuration of the terminal DB 40.

The terminal DB 40 stores information registered for the portable terminals 20 associated with the employees (users). The terminal DB 40 includes a field 41 that stores terminal management IDs, a field 42 that stores terminal names, a field 43 that stores identification information, and a field 44 that stores user names.

The field 41 stores terminal management IDs, which are identification information that is assigned to each of the registered portable terminals 20 in order to manage those portable terminals 20. The field 42 stores terminal names, which are names representing each terminal. The field 43 stores identification information that each of the portable terminals 20 have for identification purposes. The field 44 stores the names of the employees who are the users of the portable terminals 20. Upon receiving identification information from the portable terminals 20, the arrival/departure management device 10 searches the field 43 for matching information to identify the users.

The fields included in the terminal DB 40 as described above store information that is respectively associated with the portable terminals 20. For example, for "Terminal A," the terminal management ID is "A001," the identification information is "012341," and the user name is "Employee A."

Figure 5:
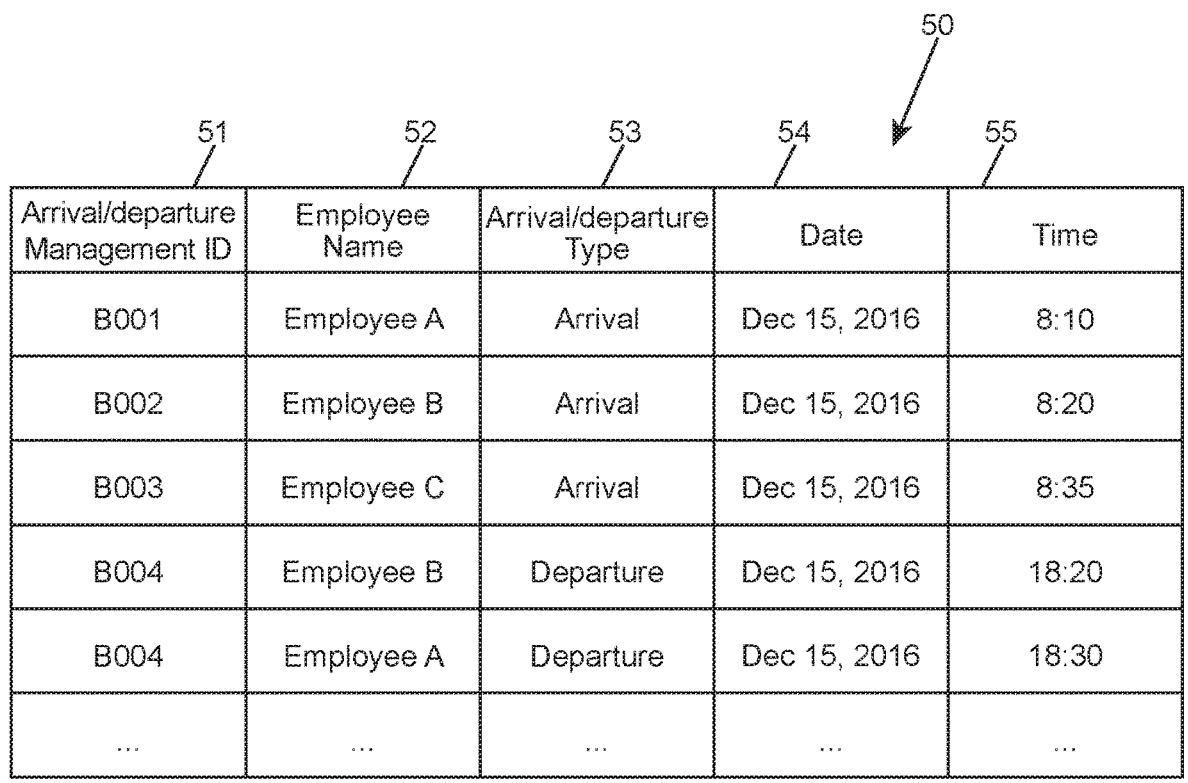
FIG. 5 illustrates the configuration of an arrival/departure DB.

Next, the arrival/departure DB 50 stored in the storage unit 15 of the arrival/departure management device 10 will be described with reference to FIG. 5. FIG. 5 illustrates the configuration of the arrival/departure DB 50.

The arrival/departure DB 50 stores arrival/departure times registered for the employees. The arrival/departure DB 50 includes a field 51 that stores arrival/departure management IDs, a field 52 that stores employee names, a field 53 that stores arrival/departure types, a field 54 that stores dates, and a field 55 that stores times.

The field 51 stores arrival/departure management IDs, which are identification information that is assigned to each set of registered arrival/departure information in order to manage that information. The field 52 stores employee names indicating to whom the registered arrival/departure information corresponds.

The field 53 stores arrival/departure types indicating whether the registered information corresponds to arrival or departure. The field 54 stores the dates of the registered arrival/departure information. The field 55 stores the times at which the employees arrived or departed.

The fields included in the arrival/departure DB 50 as described above store arrival/departure information that is respectively associated with the employees. For example, arrival/departure management ID "B001" indicates that "Employee A" arrived at "08:10" on "2016/12/15."

Next, the task DB 60 stored in the storage unit 15 of the arrival/departure management device 10 will be described with reference to FIG. 6. FIG. 6 illustrates the configuration of the task DB 60.

The task DB 60 stores information related to tasks that need to be completed by the employees. The task DB 60 includes a field 61 that stores task management IDs, a field 62 that stores task names, a field 63 that stores task details, a field 64 that stores task recipients, a field 65 that stores scheduled transmission dates, a field 66 that stores transmission status, and a field 67 that stores completion status.

The field 61 stores task management IDs, which are identification information that is assigned to each registered task in order to manage those tasks. The field 62 stores task names, which are names representing each task. The field 63 stores detailed information indicating the specific details of the registered tasks. The field 64 stores the names of the employees to which the tasks will be sent.

The field 65 stores scheduled transmission dates indicating the dates on which tasks will be sent to employees' portable terminals 20. The field 66 stores information indicating whether registered tasks have already been transmitted. A value of "Done" is stored for tasks that have already been transmitted, and a value of "Not Yet Done" is stored for tasks that have not yet been transmitted. Similar to the field 66, the field 67 stores information indicating whether registered tasks have already been completed.

The fields included in the task DB 60 as described above store information that is respectively associated with tasks. For example, for "Task A," the task management ID is "C001," the task details are "Details 1," the recipient is "Employee A," the scheduled transmission date is "2016/12/15," the transmission status is "Done," and the completion status is "Done."

Figure 7:
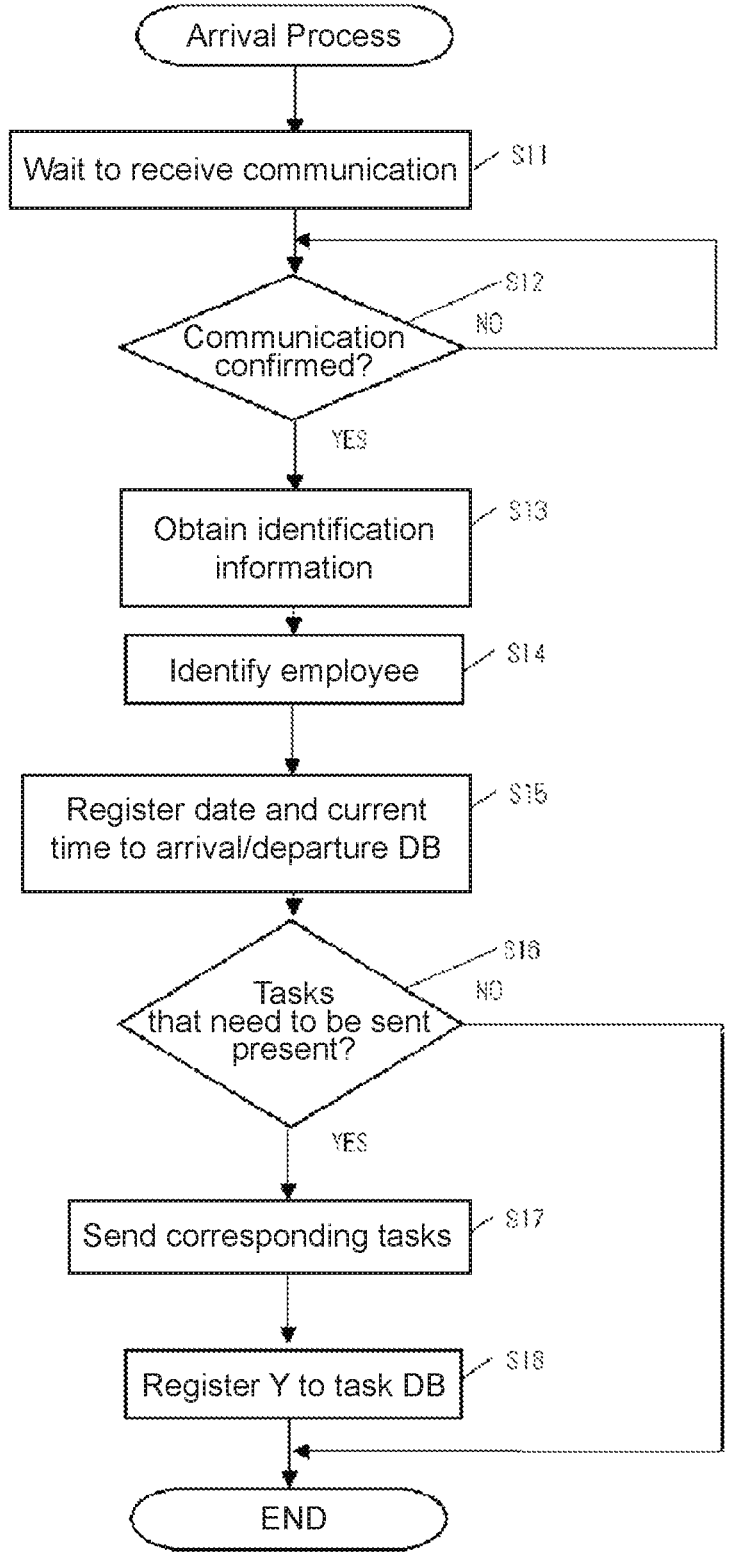
FIG. 7 is a flowchart illustrating an arrival process according to Embodiment 1.

Next, the flow of an arrival process according to Embodiment 1 will be described with reference to FIG. 7. FIG. 7 is a flowchart illustrating the arrival process according to Embodiment 1. In the arrival process, employees bring their portable terminals 20 near the arrival/departure management device 10 upon arriving at work to register their arrival times in the arrival/departure DB 50, and if there are any tasks in the task DB 60 that need to be sent to the employees, these tasks are sent to the portable terminals 20.

Employees initiate both this arrival process as well as a departure process (described later) by bringing their portable terminals 20 near the arrival/departure management device 10. Therefore, it is necessary to determine whether to perform the arrival process or the departure process when the portable terminals 20 are brought within range. The method of making this determination is not particularly limited, and may be made on the basis of an employee input operation, for example. Alternative approaches include making the arrival/departure process determination on the basis of prescribed time windows or making the determination on the basis of the previous process; i.e., performing the departure process if an employee previously performed the arrival process and performing the arrival process if the employee previously performed the departure process, for example.

Returning to FIG. 7, first, the CPU 11 proceeds to step S11 and waits to receive a communication from one of the portable terminals 20 via the NFC communication unit 18. If no communication with a portable terminal 20 is confirmed (NO in step S12), the CPU 11 continues to wait, and when a communication is confirmed (YES in step S12) the CPU 11 proceeds to step S13 and obtains the identification information from the portable terminal 20. In other words, the CPU 11 functions as the identification information obtaining process 31.

Next, the CPU 11 proceeds to step S14, compares the obtained identification information to the identification information registered in the field 43 of the terminal DB 40, and identifies the employee who is the user of the portable terminal 20. In other words, the CPU 11 functions as the employee identifying process 32.

Once the employee is identified, the CPU 11 proceeds to step S15 and registers the date and current time as obtained from the clock 17 as the arrival time to the arrival/departure DB 50 in association with the name of the identified employee. In other words, the CPU 11 functions as the arrival/departure manager 33. Next, the CPU 11 proceeds to step S16 and determines whether there are any tasks in the task DB 60 that need to be sent.

More specifically, the CPU 11 extracts, from the task DB 60, any tasks for which the recipient registered in the field 64 matches the name of the employee identified in step S14. The CPU 11 then further extracts, from this group of tasks, any tasks for which the scheduled transmission date registered in the field 65 matches the date registered in step S15 and determines that there are tasks that need to be sent if "Not Yet Done" is registered in the field 66 for any of these tasks.

If it is determined that there are no tasks in the task DB 60 that need to be sent (NO in step S16), the CPU 11 ends the arrival process. Meanwhile, if it is determined that there are tasks in the task DB 60 that need to be sent (YES in step S16), the CPU 11 proceeds to step S17 and sends the corresponding tasks to the employee's portable terminal 20. Then, the CPU 11 proceeds to step S18 and registers "Done" to the field 66 of the task DB 60 for the tasks that were sent. In other words, the CPU 11 functions as the task manager 34, the transmission/reception controller 35, and the transmitter-receiver 36.

In the arrival process described above, the employee must keep the portable terminal 20 near the NFC communication unit 18 until all of the steps have been completed. Therefore, the employee should be alerted when information is successfully received from the portable terminal 20 (such as in step S13) so that the employee is aware of the progress of the process. The method of delivering this alert is not particularly limited, and the alert may be delivered by configuring an audio output unit to make an alert sound, for example. Furthermore, although this is not illustrated in FIG. 7, an alert sound may be played upon receiving a "reception complete" notification from the portable terminal 20 after sending the information in step S17. This makes it possible for the employee to know that the arrival process is complete and to thereby know when the portable terminal 20 can be moved away. This discussion also applies to the departure process described later.

Moreover, in the arrival process as described above, tasks for the employee are sent to the employee's portable terminal 20. This makes it possible for the employee to view the received tasks on the portable terminal 20. Furthermore, the completion status of the received tasks is managed on the portable terminal 20. More specifically, upon completing a task, the employee uses the portable terminal 20 to register the task as complete on the portable terminal 20. This will be described in more detail later but makes it possible to transmit whether tasks have been completed to the arrival/departure management device 10 during the departure process. In addition, the method of registering task completion status on the portable terminal 20 is not limited to employee input operations. For example, another wireless communication terminal that the employee uses for work may communicate with the portable terminal 20 to make it possible to share tasks therebetween, and this other wireless communication terminal may determine task completion status and register this information on the portable terminal 20.

Figure 8:
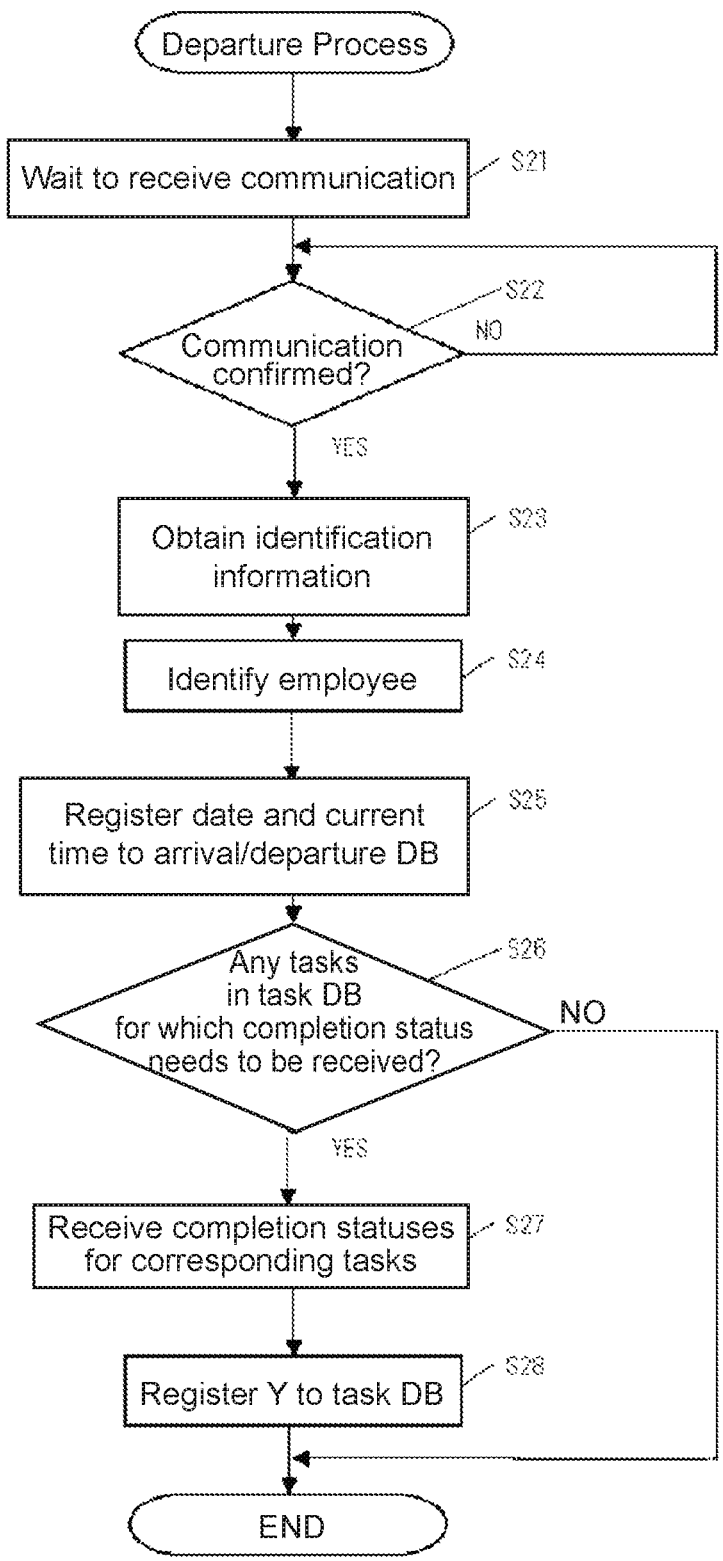
FIG. 8 is a flowchart illustrating a departure process according to Embodiment 1.

Next, the flow of the departure process according to Embodiment 1 will be described with reference to FIG. 8. FIG. 8 is a flowchart illustrating the departure process according to Embodiment 1. In the departure process, employees bring their portable terminals 20 near the arrival/departure management device 10 upon departing from work to register their departure times in the arrival/departure DB 50, and if there are any tasks for which completion has not been confirmed among the sent tasks in the task DB 60, the completion statuses are received from the portable terminals 20.

The portion of the departure process from step S21 to step S24 is the same as in the arrival process and therefore will not be described here. Once an employee is identified in step S24, the CPU 11 proceeds to step S25 and registers the date and current time as obtained from the clock 17 as the departure time to the arrival/departure management DB 50 in association with the name of the identified employee. In other words, the CPU 11 functions as the arrival/departure manager 33. Next, the CPU 11 proceeds to step S26 and determines whether there are any tasks in the task DB 60 for which completion status needs to be received.

More specifically, the CPU 11 extracts, from the task DB 60, any tasks for which the recipient registered in the field 64 matches the name of the employee identified in step S24. Then, the CPU 11 determines if, among this group of tasks, there are any tasks for which "Done" is registered to the field 66 but "Not Yet Done" is registered to the field 67. In other words, the CPU 11 determines whether there are any tasks for which completion has not yet been confirmed among the tasks that were sent upon arrival.

If it is determined that there are no tasks in the task DB 60 for which completion status needs to be received (NO in step S26), the CPU 11 ends the departure process. Meanwhile, if it is determined that there are tasks in the task DB 60 for which completion status needs to be received (YES in step S26), the CPU 11 proceeds to step S27 and receives the completion statuses for the corresponding tasks from the portable terminal 20. Then, the CPU 11 proceeds to step S28 and registers "Done" to the field 67 of the task DB 60 for any tasks for which completion was confirmed. In other words, the CPU 11 functions as the task manager 34, the transmission/reception controller 35, and the transmitter-receiver 36.

B. Embodiment 2

In Embodiment 1, tasks that need to be completed are sent upon arrival, and the completion statuses of sent tasks are received upon departure. This makes it possible to manage tasks using NFC communication that are performed upon arrival/departure. Meanwhile, in Embodiment 2, instead of sending and receiving tasks, settings registered in advance for wireless communication terminals other than portable terminals 20 are configured upon arrival/departure. This makes it possible to automatically execute any required control processes simply by performing an arrival/departure process.

Figure 9:
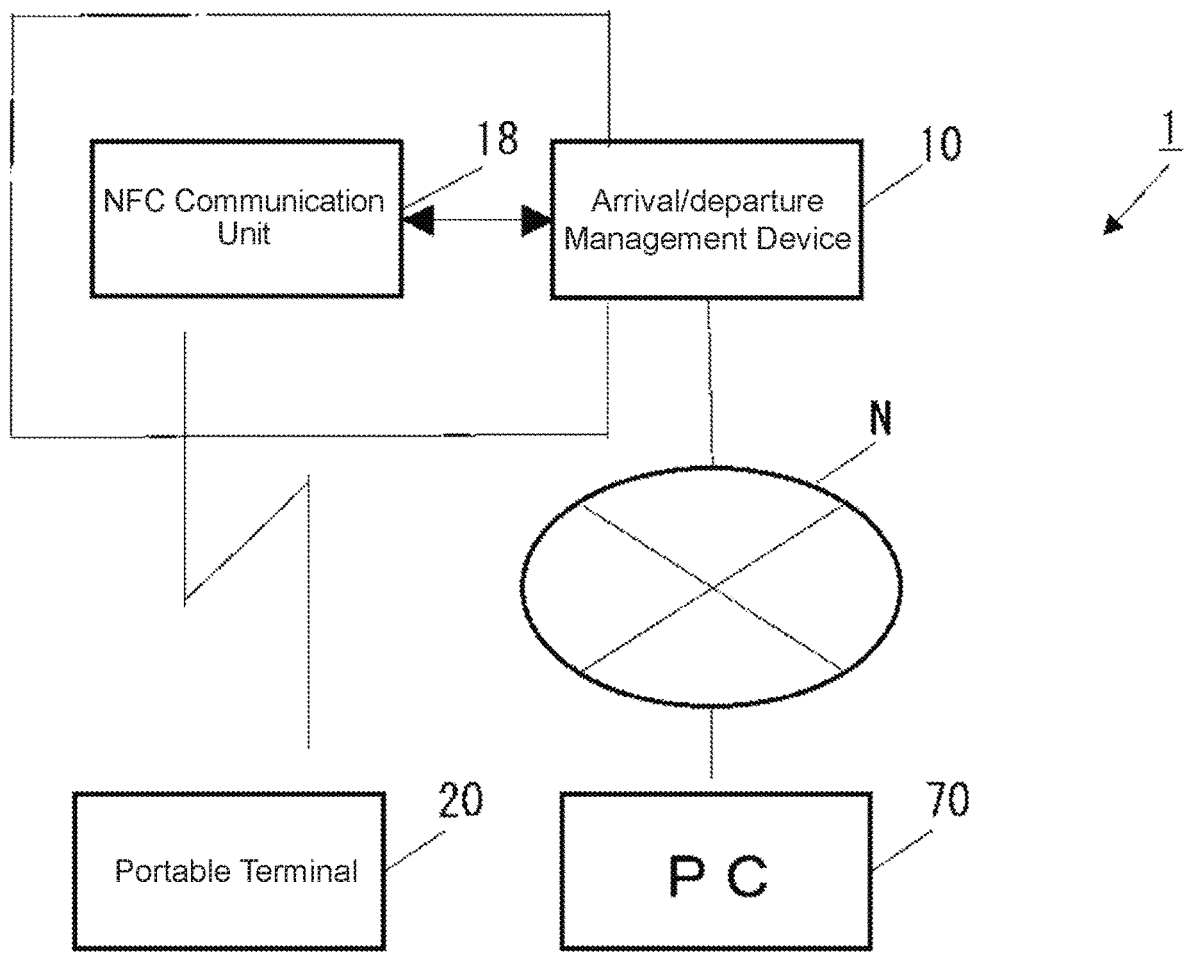
FIG. 9 is a block diagram illustrating an arrival/departure management system according to Embodiment 2.

First, an arrival/departure management system 1 according to Embodiment 2 will be described with reference to FIG. 9 as an example of an information management system. FIG. 9 is a block diagram illustrating the arrival/departure management system 1 according to Embodiment 2.

The arrival/departure management system 1 according to Embodiment 2 further includes a PC 70 in addition to the components of Embodiment 1. Here, the arrival/departure management device 10 and the portable terminals 20 are configured the same as in Embodiment 1 and therefore will not be described in detail. Moreover, although for the sake of simplicity FIG. 9 only illustrates the arrival/departure management system 1 for a single employee, in reality the arrival/departure management system 1 may include the portable terminals 20 and PCs 70 of a plurality of employees, similar to in Embodiment 1.

The PCs 70 are personal computers that the employees use to perform various work-related activities at the company and are connected to the arrival/departure management device 10 via a communication network N. Here, it is assumed that each employee respectively has a single PC 70. Moreover, these devices are not limited to being PCs and may alternatively be tablet computers or the like, for example. In addition, a plurality of PCs 70 may be connected for each employee.

The arrival/departure management device 10 stores information about the connected PCs 70 that is respectively associated in advance with the employees in the storage unit 15. Therefore, when NFC communication is performed with the portable terminals 20 and employees are identified upon arrival/departure, it is also possible to simultaneously identify the PCs 70 corresponding to those employees.

Figure 10:
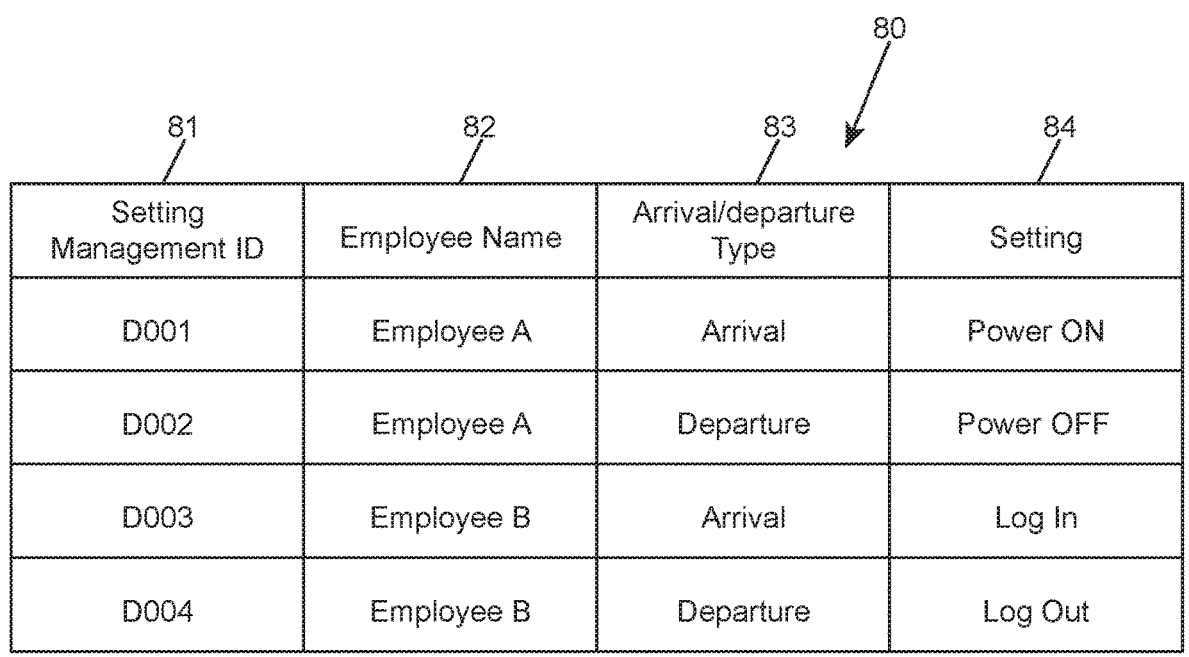
FIG. 10 illustrates the configuration of a settings DB.

Next, a settings DB 80 stored in the storage unit 15 of the arrival/departure management device 10 will be described with reference to FIG. 10. FIG. 10 illustrates the configuration of the settings DB 80.

The settings DB 80 stores settings to be applied to employees' PCs 70 when the employees perform the arrival/departure process. The settings DB 80 includes a field 81 that stores setting management IDs, a field 82 that stores employee names, a field 83 that stores arrival/departure types, and a field 84 that stores settings.

The field 81 stores setting management IDs, which are identification information that is assigned to each registered setting in order to manage those settings. The field 82 stores employee names indicating the employees to which the settings correspond. The field 83 stores arrival/departure types indicating whether the registered settings should be applied upon arrival or departure. The field 84 stores detailed information indicating the specific details of the settings to apply to the PCs 70.

Although the settings DB 80 illustrated in FIG. 10 does not indicate the target PCs 70 to which to apply the settings, if each employee has multiple PCs 70, for example, the settings DB 80 should be configured to be able to store information indicating to which PCs 70 to apply the settings.

The fields included in the settings DB 80 as described above store information that is respectively associated with settings. For example, the setting management ID indicating the setting for when "Employee A" arrives is "D001," and the setting details are "Power ON."

Figure 11:
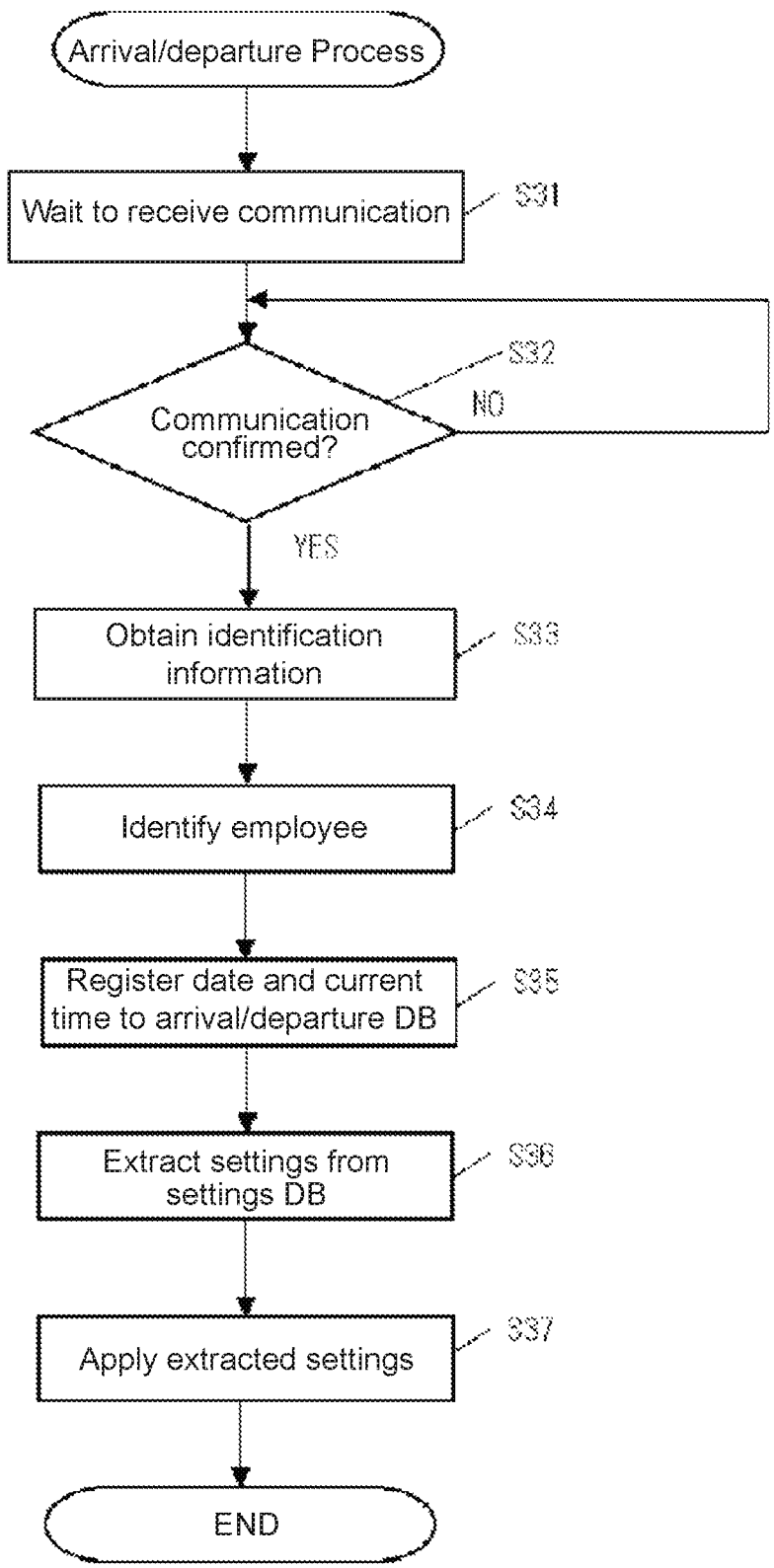
FIG. 11 is a flowchart illustrating an arrival/departure process according to Embodiment 2.

Next, the flow of the arrival/departure process according to Embodiment 2 will be described with reference to FIG. 11. FIG. 11 is a flowchart illustrating the arrival/departure process according to Embodiment 2. The following description of the flow of the arrival/departure process illustrated in FIG. 11 omits descriptions of steps that are the same as in the arrival process and departure process in Embodiment 1 and focuses only on the portions that are different.

The portion of the process from step S31 to step S35 is the same as in FIGS. 7 and 8 and therefore will not be described here. Once an arrival/departure entry is registered in step S35, the CPU 11 proceeds to step S36 and extracts the corresponding settings from the settings DB 80. More specifically, the CPU 11 searches the employee names registered in the field 82 for any entries matching the name of an employee identified in step S34. Then, the CPU 11 searches the field 83 for matching entries on the basis of whether the employee is currently arriving or departing and extracts the corresponding settings. Next, the CPU 11 proceeds to step S37 and applies the extracted settings to the corresponding PC 70 via the communication unit 16. In other words, when Employee A arrives, for example, the CPU 11 applies the "Power ON" setting from the settings DB 80 to the PC 70.

In Embodiment 2, upon arrival/departure, settings registered in advance to the field 84 of the settings DB 80 are applied to the PCs 70, which are wireless communication terminals other than portable terminals 20. However, the settings do not necessarily need to be applied to devices other than the portable terminals 20, and the settings may alternatively be applied to the portable terminals 20 themselves.

In the embodiments described above, the arrival/departure management device 10 performs near-field communication with a wireless communication terminal and identifies a user of the wireless communication terminal, registers a time of arrival or departure for the user of the wireless communication terminal that was identified, and sends information corresponding to the user when a time of arrival is registered and receives information corresponding to the user when a time of departure is registered. In other words, the arrival/departure management device 10 includes an identification unit, a registration unit, and a communication unit.

This makes it possible to perform the appropriate control processes when a time of arrival or departure is registered.

Moreover, the arrival/departure management device 10 performs near-field communication with a wireless communication terminal and identifies a user of the wireless communication terminal, registers a time of arrival or departure for the user of the wireless communication terminal that was identified, and sends information corresponding to the user when a time of departure is registered and receives information corresponding to the user when a time of arrival is registered. In other words, the arrival/departure management device 10 includes an identification unit, a registration unit, and a communication unit.

This makes it possible to perform the appropriate control processes when a time of arrival or departure is registered.

Furthermore, the arrival/departure management device 10 sends tasks to be completed by the user when sending information and receives the completion statuses of the sent tasks when receiving information. This makes it possible to manage tasks during the period from arrival to departure.

In addition, the arrival/departure management device 10 performs near-field communication with a wireless communication terminal and identifies a user of the wireless communication terminal; registers a time of arrival or departure for the user of the wireless communication terminal that was identified; and configures, on the basis of whether a time of arrival or a time of departure was registered, the wireless communication terminal or another wireless communication terminal associated with the wireless communication terminal. In other words, the arrival/departure management device 10 includes an identification unit, a registration unit, and a configuration unit.

This makes it possible to perform the appropriate control processes when a time of arrival or departure is registered.

Moreover, the arrival/departure management device 10 turns off the wireless communication terminal or the other wireless communication terminal associated with the wireless communication terminal when a time of departure is registered. This makes it possible to turn devices off upon departure.

Note that the embodiments described above are only examples of the information management device, the method of managing arrival/departure, and the recording medium according to the present invention, and the present invention is not limited to these examples.

Although in Embodiment 1 as described above information related to tasks is sent and received upon arrival/departure, the target information is not limited to being tasks. For example, the information may be files or the like for various types of data. In this case, the files should be stored on the storage unit 15 in association with the dates on which employees will need those files to be sent, and then the files should be sent to the portable terminals 20 upon arrival on the corresponding dates. This makes it possible to prevent wasteful use of storage space on the portable terminals 20.

Furthermore, when files are sent upon arrival as described above, the system should be configured to also be able to delete the sent files from the portable terminals 20 upon departure. This makes it possible to delete files that are no longer necessary upon departure, thereby preventing wasteful use of storage space on the portable terminals 20. In addition, applying these approaches makes it possible to achieve a configuration that can store files on the portable terminals 20 only during business hours. In other words, sending internal files that will only be needed during business hours to the portable terminals 20 upon arrival and then deleting those files from the portable terminals 20 upon departure makes it possible to prevent files from being taken off-site. This approach can also be applied to achieve similar effects for processes other than deletion such as configuring viewing privileges.

Moreover, although in Embodiment 1 as described above tasks are sent upon arriving at work (arrival) and the completion statuses of the tasks are received upon departing from work (departure), the present invention is not limited to this example. In other words, tasks may be sent upon departure and task completion status may be received upon arrival. One example of a situation in which this configuration could be used is for leaving for and returning from temporary outings during business hours. More specifically, letting leaving for an outing correspond to departure and returning correspond to arrival, tasks to be performed during the outing are sent upon leaving for the outing (departure), and the completion status of the tasks performed during the outing is received upon returning (arrival). This makes it possible to manage tasks during outings.

Furthermore, a configuration that does not determine in advance whether information is sent upon arrival and received upon departure or received upon arrival and sent upon departure is also possible. For example, whether information is sent or received upon arrival/departure may be configured for each task on the basis of whether a location in which the task will be completed is on-site or off-site. More specifically, first, a task location is associated with and registered for each task in the task DB 60 in advance. Then, tasks for which the task location is on-site are sent upon arrival, and completion status is received upon departure. Similarly, tasks for which the task location is off-site are sent upon departure, and completion status is received upon arrival. This makes it possible to control how information is sent and received on a per-task basis.

In addition, in Embodiment 1 as described above, when receiving completion status for tasks upon departure, only whether the tasks were completed is registered in the field 67 of the task DB 60. However, the present invention is not limited to this example. For example, for tasks that require several days to complete, the system may be configured to be able to receive progress levels for the tasks. In this case, the system should be configured to, after receiving progress levels upon departure, be able to send expected completion dates for the tasks calculated from the progress levels upon the next arrival.

Moreover, although Embodiment 1 as described above is configured to simply wait to receive completion status for sent tasks, the present invention is not limited to this example. For example, for tasks that have been sent but completion has not yet been confirmed, the system may be configured to be able to send that the tasks have not been completed not only upon arrival on the scheduled transmission date registered in the field 65 of the task DB 60 but also upon arrival on subsequent days. Moreover, the system may be configured to send that tasks have not been completed not only upon arrival but also upon departure.

Furthermore, although in Embodiment 1 as described above only a single employee is registered in the field 64 of the task DB 60 as the recipient for each task, the present invention is not limited to this example, and multiple employees may be registered. Therefore, it is also possible to send the same tasks to all of the employees.

In addition, although in Embodiment 1 as described above dates are registered to the field 65 of the task DB 60 as the scheduled transmission dates, the present invention is not limited to this example and may be configured to be able to specify times as well, for example. In this way, whether to send or receive information does not necessarily need to be determined on the basis of whether a user is arriving or departing as in the examples described above. More specifically, sending tasks during the first arrival or departure process that is performed after a scheduled transmission time has occurred yields a configuration in which information is sent and received both upon arrival and upon departure.

Moreover, although in Embodiment 1 as described above the tasks are sent to the portable terminals 20, the present invention is not limited to this example. As in Embodiment 2, the arrival/departure management system 1 may include other devices such as PCs and be configured to be able to send information to these other devices.

Furthermore, although in the embodiments above the arrival/departure management device 10 was described as an example of the information management device and arriving at work and departing from work were described as examples of arrival and departure, the present invention is not limited to these examples. For example, NFC communication with the same portable terminals 20 as in the embodiments described above can be used in situations such as arriving at and departing from event venues. Configurations similar to those described above can be implemented in these situations as well.

In addition, although in the embodiments described above the arrival/departure management device 10 obtains terminal identification information from the portable terminals 20 and then uses the terminal DB 40 to identify the users corresponding to that identification information, the present invention is not limited to this example. For example, instead of terminal identification information, user identification information that can be used to identify the users may be obtained from the portable terminals 20. In this case, configuring the portable terminals 20 to allow selection of which user identification information to send from among multiple sets of such information makes it possible for multiple users to share the portable terminals 20.

Moreover, although in the embodiments above Embodiment 1 and Embodiment 2 were described separately, the two embodiments may also be combined. In this case, performing step S36 to step S37 from the arrival/departure process in Embodiment 2 as illustrated in FIG. 11 after step S18 in the arrival process in Embodiment 1 as illustrated in FIG. 7 and after step S28 in the departure process illustrated in FIG. 8 makes it possible to both send and receive tasks as well as apply settings to the PCs 70.

Furthermore, the portion of the system that includes components such as the CPU 11, the RAM 13, and the storage unit 15 and executes the arrival/departure processes can be implemented using a standard computer system rather than a dedicated system. For example, computer programs for executing these processes may be stored on and distributed in the form of a computer-readable recording medium (such as floppy disks, CD-ROMs, or DVD-ROMs), and these computer programs may be installed on a computer to provide the portion of the system for executing the arrival/departure processes. In addition, the computer programs may be stored on a storage device of a server on a communication network such as the internet and be downloaded or the like by a standard computer system to provide the portion of the system for executing the arrival/departure processes.

Moreover, when the functionality of the portion of the system for executing the arrival/departure processes is split between an operating system (OS) and an application program or achieved by cooperation between the OS and the application program, for example, just the application program portion may be stored on the storage medium or storage device.

Furthermore, the computer programs can be distributed via a communication network. For example, the computer programs may be posted on forums on the communication network, and the computer programs may be distributed via the network. In addition, the computer programs may be launched and executed similar to other application programs by an OS in order to achieve a configuration that can execute the processes described above.

Although several embodiments of the present invention were described above, these embodiments are only examples and do not limit the technical scope of the present invention in any way.

The present invention can take the form of various other embodiments, and various modifications such as removal or replacement of components may be made without departing from the spirit of the present invention. These embodiments and modifications thereof are included within the scope and spirit of the invention as described in the present specification and the like and are also included within the scope of the invention as defined in the claims and their equivalents.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An information management device, comprising:
a processor;
a storage device connected to the processor; and
a near-field wireless communication unit connected to the processor, configured to wirelessly communicate with a portable wireless communication terminal assigned to and carried by a user when the user with the wireless communication terminal is within a near-field communication range,
wherein the processor identifies the user to which the wireless communication terminal is assigned based on information received by the near-field wireless communication unit from the wireless communication terminal,
wherein the processor registers a time of arrival or departure of the user identified by the processor in the storage device when the user with the wireless communication terminal is within the near-field communication range for the arrival or departure,
wherein the near-field wireless communication unit is installed at a workplace so that the arrival is the user arriving to work or returning from an outing, and the departure is the user departing from work or leaving for the outing,
wherein when the processor registers the time of arrival as a first form of arrival that is the user arriving to work as a result of the user being within the near-field communication range due to the arrival, the processor, at the same time while the user is still within the near-field communication range, causes the near-field wireless communication unit to send information on a first task to be performed by the identified user at the workplace to the wireless communication terminal assigned to the identified user, wherein when the processor registers the time of departure as a first form of departure that is the user leaving for the outing work as a result of the user being within the near-field communication range due to the departure, the processor, at the same time while the user is still within the near-field communication range, causes the near-field wireless communication unit to send information on a second task to be performed by the identified user at another place that is a destination of the outing other than the workplace to the wireless communication terminal assigned to the identified user, wherein when the processor registers the time of departure as a second form of departure that is the user departing from work as a result of the user being within the near-field communication range due to the departure, the processor, at the same time while the user is still within the near-field communication range, causes the near-field wireless communication unit to receive completion status information of said first task that has been performed at the workplace by the identified user from the wireless communication terminal assigned to the identified user, and wherein when the processor registers the time of arrival as a second form of arrival that is the user returning from the outing as a result of the user being within the near-field communication range due to the arrival, the processor, at the same time while the user is still within the near-field communication range, causes the near-field wireless communication unit to receive completion status information of said second task that has been performed by the identified user at the another place from the wireless communication terminal assigned to the identified user.

2. The device according to claim 1, wherein upon registering the time of arrival or departure of the user identified by the processor, the processor determines whether the time of arrival or departure of the user registered in the storage device is a time of arrival for arriving to work that is the first form of arrival or a time of departure for leaving for the outing that is the first form of departure.

3. The device according to claim 1, wherein said information on the first task to be performed at the workplace and said information on the second task to be performed at the another place includes information on a place where the task is to be performed.

4. A method of managing arrival/departure using a device having a processor; a storage device connected to the processor; and a near-field wireless communication unit connected to the processor, configured to wirelessly communicate with a portable wireless communication terminal assigned to and carried by a user when the user with the wireless communication terminal is within a near-field communication range, the method being performed by the processor and comprising:

identifying the user to which the wireless communication terminal is assigned based on information received by the near-field wireless communication unit from the wireless communication terminal; and registering a time of arrival or departure of the user identified by the processor in the storage device when the user with the wireless communication terminal is within the near-field communication range for the arrival or departure, wherein the near-field wireless communication unit is installed at a workplace so that the arrival is the user arriving to work or returning from an outing, and the departure is the user departing from work or leaving for the outing, and wherein the method further includes:

when the time of arrival is registered as a first form of arrival that is the user arriving to work as a result of the user being within the near-field communication range due to the arrival, at the same time while the user is still within the near-field communication range, causing the near-field wireless communication unit to send information on a first task to be performed by the identified user at the workplace to the wireless communication terminal assigned to the identified user, when the time of departure is registered as a first form of departure that is the user leaving for the outing as a result of the user being within the near-field communication range due to the departure, at the same time while the user is still within the near-field communication range, causing the near-field wireless communication unit to send information on a second task to be performed by the identified user at another place that is a destination of the outing other than the workplace to the wireless communication terminal assigned to the identified user, when the time of departure is registered as a second form of departure that is the user departing from work as a result of the user being within the near-field communication range due to the departure, at the same time while the user is still within the near-field communication range, causing the near-field wireless communication unit to receive completion status information of said first task that has been performed at the workplace by the identified user from the wireless communication terminal assigned to the identified user, and wherein when the time of arrival is registered as a second form of arrival that is the user returning from the outing as a result of the user being within the near-field communication range due to the arrival, at the same time while the user is still within the near-field communication range, causing the near-field wireless communication unit to receive completion status information of said second task that has been performed by the identified user at the another place from the wireless communication terminal assigned to the identified user.

5. A non-transitory computer-readable storage medium that stores instructions executable by a processor that is connected to a storage device and a near-field wireless communication unit configured to wirelessly communicate with a portable wireless communication terminal assigned to and carried by a user when the user with the wireless communication terminal is within a near-field communication range, the instructions causing the processor to perform the following:

identifying the user to which the wireless communication terminal is assigned based on information received by the near-field wireless communication unit from the wireless communication terminal; and registering a time of arrival or departure of the user identified by the processor in the storage device when the user with the wireless communication terminal is within the near-field communication range for the arrival or departure, wherein the near-field wireless communication unit is installed at a workplace so that the arrival is the user arriving to work or returning from an outing, and the departure is the user departing from work or leaving for the outing, and wherein the instructions cause the processor to further perform the following:

when the time of arrival is registered as a first form of arrival that is the user arriving to work as a result of the user being within the near-field communication range due to the arrival, at the same time while the user is still within the near-field communication range, causing the near-field wireless communication unit to send information on a first task to be performed by the identified user at the workplace to the wireless communication terminal assigned to the identified user, when the time of departure is registered as a first form of departure that is the user leaving for the outing as a result of the user being within the near-field communication range due to the departure, at the same time while the user is still within the near-field communication range, causing the near-field wireless communication unit to send information on a second task to be performed by the identified user at another place that is a destination of the outing other than the workplace to the wireless communication terminal assigned to the identified user, and when the time of departure is registered as a second form of departure that is the user departing from work as a result of the user being within the near-field communication range due to the departure, at the same time while the user is still within the near-field communication range, causing the near-field wireless communication unit to receive completion status information of said first task that has been performed at the workplace by the identified user from the wireless communication terminal assigned to the identified user, and wherein when the time of arrival is registered as a second form of arrival that is the user returning from the outing as a result of the user being within the near-field communication range due to the arrival, at the same time while the user is still within the near-field communication range, causing the near-field wireless communication unit to receive completion status information of said second task that has been performed by the identified user at the another place from the wireless communication terminal assigned to the identified user.

* * * * *